Feb. 11, 1936.  V. L. MAURIN  2,030,599
LOCKING MECHANISM
Filed Dec. 15, 1934   2 Sheets-Sheet 1
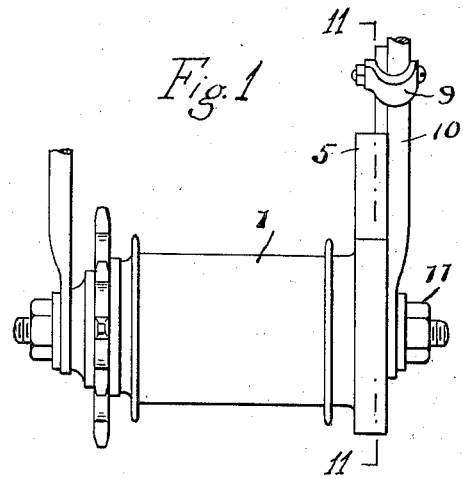
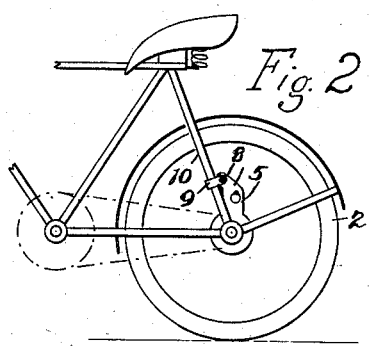
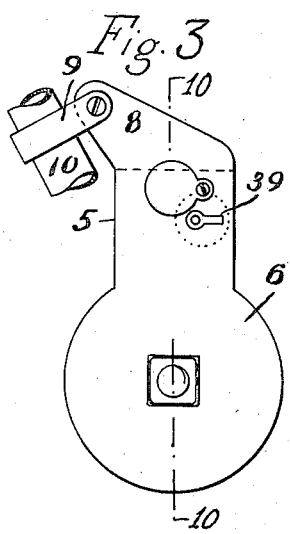
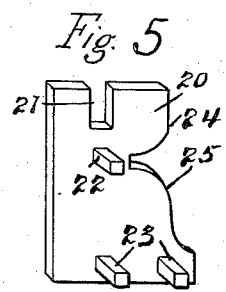
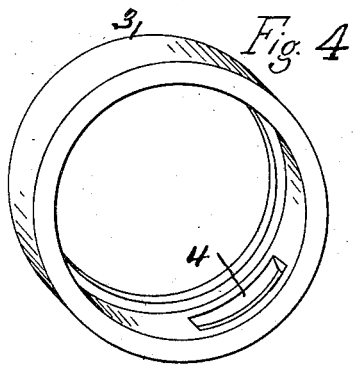
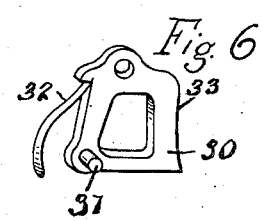
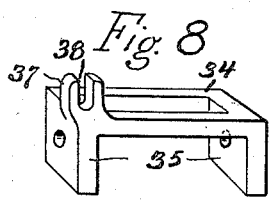
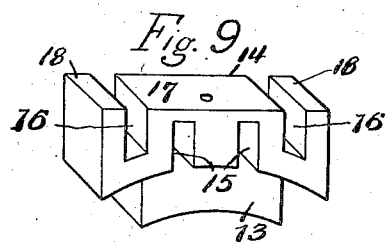
Inventor
Vicente L. Maurin
by Jno Fenbrie
Atty.

Feb. 11, 1936.  V. L. MAURIN  2,030,599
LOCKING MECHANISM
Filed Dec. 15, 1934  2 Sheets-Sheet 2
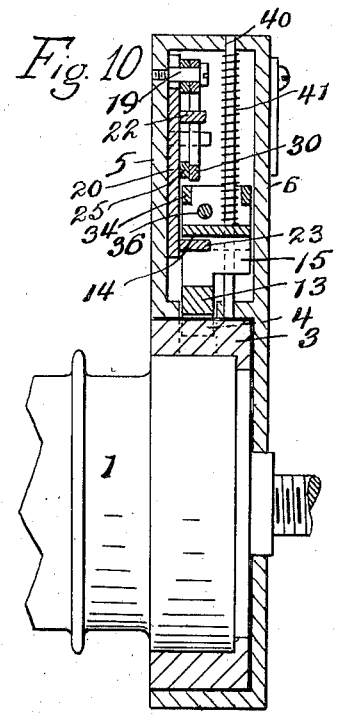
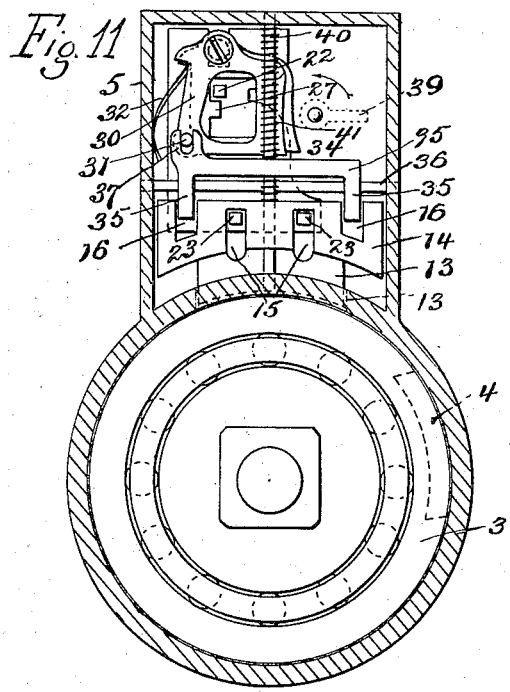
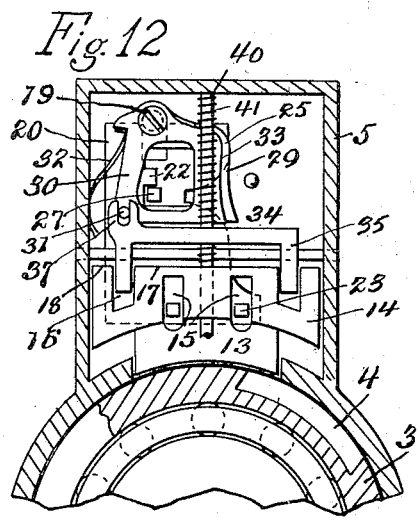
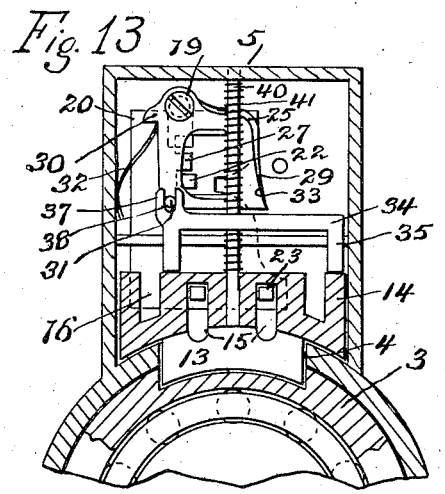
Inventor
Vicente L. Maurin
by [signature]
Atty.

Patented Feb. 11, 1936

2,030,599

UNITED STATES PATENT OFFICE 2,030,599

LOCKING MECHANISM

Vicente Lopez Maurin, Habana, Cuba

Application December 15, 1934, Serial No. 757,722
In Cuba July 17, 1934

7 Claims. (Cl. 70—75)

This invention is directed to a means for locking a wheel against rotation, and is primarily directed to means for locking the wheel of a bicycle or the like to prevent unauthorized use of the bicycle.

The primary object of the present invention is the provision of a construction designed to form a more or less permanent part of the vehicle, though capable of bodily separation therefrom at will, and including a casing having a bolt designed to be moved into locking or nonlocking relation to the hub of the wheel or to a part carried thereby, with key-controlling elements mounted in the casing for governing the position of the locking element at will.

The invention is illustrated in the accompanying drawings, in which:

Figure 1 is a broken view in elevation showing sufficient of a bicycle structure to illustrate the application of the invention thereto.

Figure 2 is an elevation of a rear portion of a bicycle, showing the improved locking means in position.

Figure 3 is an enlarged front elevation of the locking means as a whole.

Figure 4 is a perspective view of the hub ring showing the locking recess.

Figure 5 is a perspective view of the retractor.

Figure 6 is a perspective view of the lever.

Figure 7 is a perspective view of the swinging tumbler.

Figure 8 is a perspective view of the dog.

Figure 9 is a perspective view of the bolt.

Figure 10 is a sectional view on the line 10—10 of Figure 3, with the lock in applied position.

Figure 11 is a section on the line 11—11 of Figure 1.

Figure 12 is a vertical sectional view, partly in elevation, illustrating the parts in the position occupied when the bolt is in released position.

Figure 13 is a similar view showing the bolt in applied or locking position.

For the purpose of the present description, the invention is shown as applied to a bicycle wherein the hub 1 of the rear wheel 2 is provided with a band 3 rigidly secured in place and provided at an appropriate point with an elongated channel or recess 4, hereinafter termed the locking recess.

The locking mechanism proper includes a hollow rectangular casing 5, one side of which, as 6, may be constructed as a removable cover plate, which plate is extended below the casing 5 to overlie the hub of the wheel and underlie the band 3, as clearly shown in Figure 10. The casing 5 overlies and is in vertical alignment with the band 3, the lower wall 7 of the casing 5 conforming in shape to and being slightly spaced from the peripheral surface of the ring 3.

The casing 5 is provided with an angular projection 8 at the upper end carrying a clamping member 9 designed to be secured to a frame part 10 of the vehicle, while the conventional securing nut 11 for the rear wheel overlies the cover plate 6, inwardly of the conventional frame end, and thus the locking means as a whole is rigidly secured in position.

The locking mechanism within the casing 5 includes a bolt 12, shown more particularly in Figure 9. This bolt includes a locking lug 13 of a size and shape to fit within the locking recess 4 of the band 3, and above the lug 13 the bolt is enlarged, as at 14, in a substantially rectangular form, the length of which corresponds approximately to the similar dimension of the interior of the casing 5 while the width is somewhat less than the similar dimension of the casing.

This enlargement 14 is formed with transversely ranging spaced channels 15 which extend from the lower edge of the enlargement to a point short of the upper surface thereof, so that the upper ends of the channels are closed. The upper surface of the enlargement 14 is formed in each direction beyond the channels 15 with a transversely ranging channel 16 which opens through the upper edge of the enlargement, as clearly shown in Figure 9. The upper surface of the enlargement, between the channels 16, presents a flat face 17 and the upper edges of the enlargement beyond the channels present surfaces 18 in the plane of the surface 17.

Threaded into the rear wall of the casing 5 near the upper end thereof is a pin support 19. Mounted for sliding movement on and with respect to the pin support is a retractor 20, shown more particularly in Figure 5. This retractor is formed with a recess 21 opening through the upper edge thereof which is designed to embrace the pin 19 and guide the retractor while permitting vertical movement thereof.

The retractor 20, when in position, is designed to rest against the rear wall of the casing 5, and below the recess 21 the retractor is formed with an outstanding locking projection 22 and the retractor is further formed near the lower edge with spaced lifting projections 23 which, when the retractor is in applied position, are designed to engage in the channels 15 of the bolt. The retractor 20 is shaped on one edge to provide guiding surfaces 24 and 25 through which and the use of a proper key, the retractor, when free to move, may be raised or lowered in accordance with the operation of the key.

Pivotally supported upon the pin 19 and overlying the retractor 20 is a swinging tumbler 25. This tumbler is of skeleton form having a central rectangular opening 26 from one edge of which extends a projection 27 in position to cooperate with the projection 22 on the retractor. A leaf spring 28 is carried by the tumbler 25 to bear against the side wall of the casing and normally hold the tumbler in position to cause the projection 27 to underlie the projection 22 on the retractor and thereby hold said retractor against downward movement. One edge of the tumbler, as 29, is formed to respond to key movement and by such movement be displaced against the tension of the spring 28 to move the projection 27 from the path of movement of the projection 22.

Overlying the tumbler 25 and pivotally supported upon the pin 19 is a lever 30. This cam is also of skeleton form and provided in its lower portion adjacent one side edge with a pin-like projection 31. The lever 30 carries a leaf spring 32 which is adapted to bear against the side wall of the casing 5 and hold the lever and thereby the projection 31 in a predetermined normal position. One edge of the lever, as 33, is formed to respond to key action, so that under such key action the lever will be moved against the influence of its spring 32.

The vertical dimension of the tumbler and the lever is materially less than that of the retractor, so that the lower edges of the tumbler and lever are materially above the bolt, as will be clear from Figure 10. Intermediate the tumbler and lever and bolt is a dog including a U-shaped plate 34, the depending walls 35 of which are spaced apart in accordance with the spacing of the channels 16 in the bolt and are of such size as to freely enter said channels when in proper position. The dog is slidable on a rod 36 secured in the end walls of the casing 5 and is provided with an upstanding projection 37 cut out at 38 to receive the pin 31 of the lever. The lower edges of the depending walls 35 of the dog move in a plane coincident with the plane of the upper edge 14 of the bolt. The forward wall or cover plate 6 of the casing is provided with a key-hole 39 through which an appropriate key may be introduced.

The bolt 13 is supported for vertical sliding movement on a rod 40 secured in the upper and lower end walls of the casing, a coil spring 41 on the rod serving to influence the bolt toward downward or locking movement.

With particular reference to Figure 12, wherein it will be seen that the parts are shown in unlocked or released position, it will be noted that the retractor is at its upper limit of movement, being held in this position by the projection 27 of the tumbler underlying the projection 22 of the retractor. The lever is at the limit of movement against the influence of the spring 32, being held in this position by the position of the dog 34, the arms 35 of which are engaged in the channels 16 of the bolt, and the bolt is held elevated by the projections 23 of the retractor 20.

If it is desired to lock the wheel, the key is inserted and in the initial operation moves the tumbler to displace the projection 27 from beneath the projection 22 and in the further movement of the tumbler, the key engages the surfaces 25 and moves the retractor 20 downwardly. This relieves the bolt of the holding force of the projections 23 and the spring 41 moves the bolt downwardly to cause the locking lug 13 to enter the locking recess 4 in the band 3. If, in the locking operation, the recess 4 is not in position to receive the lug 13, a slight turning of the wheel will cause proper registry and permit the wheel to move into the recess.

As the bolt moves downwardly, the depending arms 35 of the dog are freed from the channels 16 and as the lever 30 is at this time under the tension of the spring 32, said cam moves outwardly from the side wall of the casing 5 and moves the yoke longitudinally on the rod 36 until the lower edges of the arms 35 overlie the surfaces 17 and 18 of the bolt. At this time, the key frees the tumbler 25 to the influence of the spring 28 and the projection 27 on the tumbler moves laterally into a position above the projection 22 on the retractor and thus the parts are locked in position to hold the bolt and more particularly the lug 13 thereof in cooperation with the locking recess 4 in the band 3. The wheel is thus locked against rotation and unauthorized use of the vehicle or bicycle prevented.

Through the use of a proper key, the initial action is to move the lever to a position to tension the spring 32. This moves the dog so that the depending arms 35 register with the channels 16 in the bolt. Simultaneously with this movement of the lever, the tumbler is moved by the key to move its projection 27 from above and out of the path of movement of the projection 22 of the retractor 20. The key then cooperates with the surface 24 of the retractor 20 and thereby operates the retractor, causing the projections 23, seated in the channels 15, to correspondingly raise the bolt and remove the locking lug 13 from the locking recess 4. As the bolt and retractor move upwardly under this key action, the tumbler moves outwardly to a position to cause its projection 27 to ride beneath the projection 22 on the retractor 20. The retractor and bolt are thus held elevated in non-locking position.

In the elevation of the bolt, the channels 16 ride onto the depending arms 35 of the dog 34 and prevent the dog and thereby the lever from moving to a position which would be indicated by the tension of the force of the spring when the key is removed. Thus, the lever is, when the parts are in unlocked relation, in position to automatically move the dog when the latter is freed from the channel 16 of the bolt to lock such bolt against upward or unlocking movement.

By the construction described, any tractive wheel, or in fact any wheel having rotative movement, may be locked against such rotation at will, the various parts acting, either in response to key movement or automatically and simultaneously with key movement, to cause a locking or unlocking operation.

While the invention has been described more particularly in connection with a bicycle, it is understood that it is in nowise limited thereto and that it is designed broadly as a wheel lock and may be used in any and all convenient positions where the locking and release of a wheel may be found desirable. The instrument as a whole, particularly when used in connection with a bicycle, is ordinarily a fixture thereof and while capable of separation, as for example by detaching the nut 11 and the clamp 9, is intended more particularly as an accessory to be conveniently applied to an otherwise conventionally constructed bicycle, and in this particular the parts here defined will, when necessary, be varied in form and shape to accord with the particular make of bicycle with which they are to be used.

What is claimed to be new is:

1. A lock for bicycles and the like, including a casing, a bolt movable in the casing, a locking lug forming part of said bolt, a retractor in the casing for moving the bolt to unlocked position, a tumbler for holding the retractor in operated position, and key-controlled means for holding the bolt in locking position.

2. A lock for bicycles and the like, including a casing, a bolt movable in the casing, and including a locking lug, spring means in the casing for projecting the bolt into locking position, a retractor in the casing for moving the bolt into inoperative position, a tumbler cooperating with the retractor to lock the retractor in either of its positions, a dog movable in the casing to either of two positions, one to permit an operative movement of the bolt and another to lock the bolt in operative position, and a lever for operating the dog.

3. A construction as defined in claim 2, wherein the dog is mounted for movement in a predetermined path transverely of the casing.

4. A construction as defined in claim 2, wherein the dog is designed to cooperate with recesses in the bolt in one position of the dog and to engage the upper surface of the bolt in another position of the dog.

5. A construction as defined in claim 2, wherein the retractor, lever and tumbler are key-controlled.

6. A lock for bicycles and the like, including a casing, a bolt movable longitudinally thereof and including a locking lug, said bolt being formed with an inner set of channels closed at the upper end and an outer set of channels open at the upper end, a retractor slidable in the casing, projections in the retractor to engage in the inner set of channels to lift the bolt in the movement of the retractor in one direction, a dog to engage in the outer set of channels to permit movement of the bolt under the influence of the retractor, said dog being designed to engage the upper surface of the bolt in another position to hold the bolt in operated position, means for operating the locking dog, and means for locking the retractor in either position.

7. A construction as defined in claim 6, wherein the means for operating the dog is normally under tension to move the dog from one position to the other under operative movement of the bolt.

VICENTE LOPEZ MAURIN.